(12) United States Patent
Lu

(10) Patent No.: US 7,889,448 B2
(45) Date of Patent: Feb. 15, 2011

(54) MAGNETIC SPACING MEASUREMENT

(75) Inventor: Danzhu Lu, San Jose, CA (US)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 0 days.

(21) Appl. No.: 10/990,052

(22) Filed: Nov. 15, 2004

(65) Prior Publication Data

US 2006/0103959 A1    May 18, 2006

(51) Int. Cl.
    *G11B 27/36* (2006.01)
(52) U.S. Cl. .................. 360/31; 360/75; 360/77.02
(58) Field of Classification Search .................. None
    See application file for complete search history.

(56) References Cited

U.S. PATENT DOCUMENTS

| | | | | |
|---|---|---|---|---|
| 4,777,544 A * | 10/1988 | Brown et al. | ................ | 360/75 |
| 5,130,866 A | 7/1992 | Klaassen et al. | | |
| 5,168,413 A | 12/1992 | Coker et al. | | |
| 5,377,058 A * | 12/1994 | Good et al. | .................. | 360/75 |
| 5,410,439 A | 4/1995 | Egbert et al. | | |
| 5,412,519 A * | 5/1995 | Buettner et al. | .......... | 360/73.03 |
| 5,784,296 A * | 7/1998 | Baker et al. | .................. | 702/76 |
| 5,810,477 A * | 9/1998 | Abraham et al. | ............... | 374/7 |
| 5,880,587 A * | 3/1999 | Annis et al. | ................. | 324/212 |
| 6,249,393 B1 * | 6/2001 | Billings et al. | ............... | 360/31 |
| 6,288,856 B1 * | 9/2001 | Ottesen et al. | ............... | 360/31 |
| 6,384,995 B1 * | 5/2002 | Smith | .......................... | 360/31 |
| 6,519,102 B1 * | 2/2003 | Smith et al. | ................... | 360/31 |
| 6,608,727 B2 * | 8/2003 | Ottesen et al. | ............... | 360/31 |
| 6,611,389 B1 * | 8/2003 | Liu et al. | ...................... | 360/31 |
| 6,717,764 B2 * | 4/2004 | Lake | ........................... | 360/75 |
| 6,735,027 B2 | 5/2004 | Helsel et al. | | |
| 6,785,079 B2 * | 8/2004 | Brannon et al. | ............... | 360/75 |
| 6,898,034 B2 * | 5/2005 | Dakroub et al. | ............... | 360/31 |
| 6,934,100 B2 * | 8/2005 | Ueno | .......................... | 360/31 |
| 6,950,267 B1 * | 9/2005 | Liu et al. | ...................... | 360/75 |
| 7,016,131 B2 * | 3/2006 | Liu et al. | ...................... | 360/31 |
| 7,199,956 B1 * | 4/2007 | Moser et al. | .................. | 360/46 |
| 7,199,961 B1 * | 4/2007 | Wu et al. | ...................... | 360/75 |
| 7,369,341 B2 * | 5/2008 | Yokohata et al. | ............. | 360/31 |
| 7,522,360 B2 * | 4/2009 | Imamura et al. | ............. | 360/31 |
| 2003/0123171 A1 * | 7/2003 | Smith et al. | ................... | 360/31 |
| 2005/0024761 A1 * | 2/2005 | Lou et al. | ..................... | 360/75 |
| 2005/0046982 A1 * | 3/2005 | Liu et al. | ...................... | 360/31 |

OTHER PUBLICATIONS

"Engineering realization of triple harmonic methods on in-situ FH test" INTERMAG Eur. 2002 Dig. Dp-05.

"Triple harmonic method for in-situ flying height measurement" Data Stor. Inst. 2000.

(Continued)

*Primary Examiner*—Dismery E Mercedes

(57) ABSTRACT

One embodiment in accordance with the invention includes a method. The method can include utilizing a harmonic test on a magnetic disk of a hard disk drive that produces a first result and a second result. A magnetic spacing distance between a transducer head of the hard disk drive and the magnetic disk can be determined utilizing the first result and the second result. A flying height between a head structure of the hard disk drive and a surface of the magnetic disk can be determined utilizing the magnetic spacing distance.

32 Claims, 6 Drawing Sheets

OTHER PUBLICATIONS

HSGT Recording Physics web page http://www.dsi.nus.edu.sg/track/hdi/research/pdf/triple_harmonic.pdf.
"In-situ flying height technology" IEEE 2002 Asia-Pacific Mag. Rec. Conference. TU-P-13-01,02.
"Asperity Knee Detection Using Harmonic Ratio Flyheight" IBM Anon. Disc. R08900477.
"Glide Test Technique" IBM TDB, Feb. 1990, pp. 280ff.
"Flying Height Modulation Estimation From Pseudorandom Readback Signal in Disk Drives" IEEE Mag-39 n.5, pp. 2417ff.
"Head-Medium Clearance and Lateral Track Registration of a Recording Head as Measured from the Readback Signal" IEEE Mag-37 n.1, pp. 575ff.
"Use of Readback Signal Modulation to Measure Head/Disk Spacing Variations in Magnetic Disk Files" IEEE Mag-23 n.1, pp. 233ff.

* cited by examiner

300

Writing a pattern on a disk to establish a harmonic having a 1st measured harmonic and another higher order measured harmonic
302

Determine the magnetic spacing between the read/write head and disk using the 1st measured harmonic and the higher order measured harmonic
304

Determine the flying height between the head structure and disk top surface by subtracting one or more parameters from the magnetic spacing
306

Using a harmonic test on a disk to produce a first result and a second result
502

↓

Determine the magnetic spacing between the read/write head and disk using the first and second results
504

↓

Determine the flying height between the head structure and disk top surface using the magnetic spacing
506

FIG. 5

MAGNETIC SPACING MEASUREMENT

BACKGROUND

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 40 years ago and resembles a phonograph. That is, the hard drive model can include a storage disk or hard disk that spins at a standard rotational speed. A magnetic read/write transducer head can be mounted on an actuator arm for reading/writing information to or from a location on the disk. The actuator arm or slider is utilized to reach out over the disk to or from a location on the disk. The complete assembly, e.g., the arm and head, is called a head gimbal assembly (HGA).

In operation, the hard disk is rotated at a set speed via a spindle motor assembly having a central drive hub. Additionally, there are channels or tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, refinements of the disk and the head have provided great reductions in the size of the hard disk drive. For example, the original hard disk drive had a disk diameter of 24 inches. Modern hard disk drives are much smaller and include disk diameters of less than 2.5 inches (micro drives are significantly smaller than that). Refinements also include the use of smaller components. That is, by reducing the read/write tolerances of the head portion, the tracks on the disk can be reduced in size by the same margin. Thus, as modern micro recognition technology is applied to the head, the track size on the disk can be further compressed.

A second refinement to the hard disk drive is the reduction of the "flying" height at which the magnetic read/write transducer head operates or flies above the disk. As the flying height has been continually reduced, a greater number of data can be stored on a disk surface. Note that during a disk drive manufacturing process, if the flying height is either too high or too low, the resulting disk drive may not operate properly. As such, it is desirable to be able to measure the flying height accurately. However, as the flying heights have become ever smaller, for example, less than 10 nanometers (nm), it has become more difficult to accurately measure the flying height.

For example, some conventional techniques for attempting to measure the flying height can involve signal measurements using pulse width measurements, amplitude measurements, or third harmonic techniques. However, as flying heights get smaller and smaller and density gets higher and higher, these signal measurement techniques are not as desirable due to head saturation and low third harmonic amplitude. As such, these techniques are not as accurate.

SUMMARY

One embodiment in accordance with the invention includes a method. The method can include utilizing a harmonic test on a magnetic disk of a hard disk drive that produces a first result and a second result. A magnetic spacing distance between a transducer head of the hard disk drive and the magnetic disk can be determined utilizing the first result and the second result. A flying height between a head structure of the hard disk drive and a surface of the magnetic disk can be determined utilizing the magnetic spacing distance.

BRIEF DESCRIPTION OF THE DRAWINGS

FIG. 3 is a flowchart of a method in accordance with embodiments of the invention for determining a flying height.

FIG. 5 is a flowchart of a method in accordance with embodiments of the invention for determining a flying height.

DETAILED DESCRIPTION

Reference will now be made in detail to embodiments in accordance with the invention, examples of which are illustrated in the accompanying drawings. While the invention will be described in conjunction with embodiments, it will be understood that these embodiments are not intended to limit the invention. Furthermore, in the following detailed description of embodiments in accordance with the invention, numerous specific details are set forth in order to provide a thorough understanding of the invention. In other instances, well known methods, procedures, components, and circuits have not been described in detail as not to unnecessarily obscure aspects of the invention.

Figure 1:
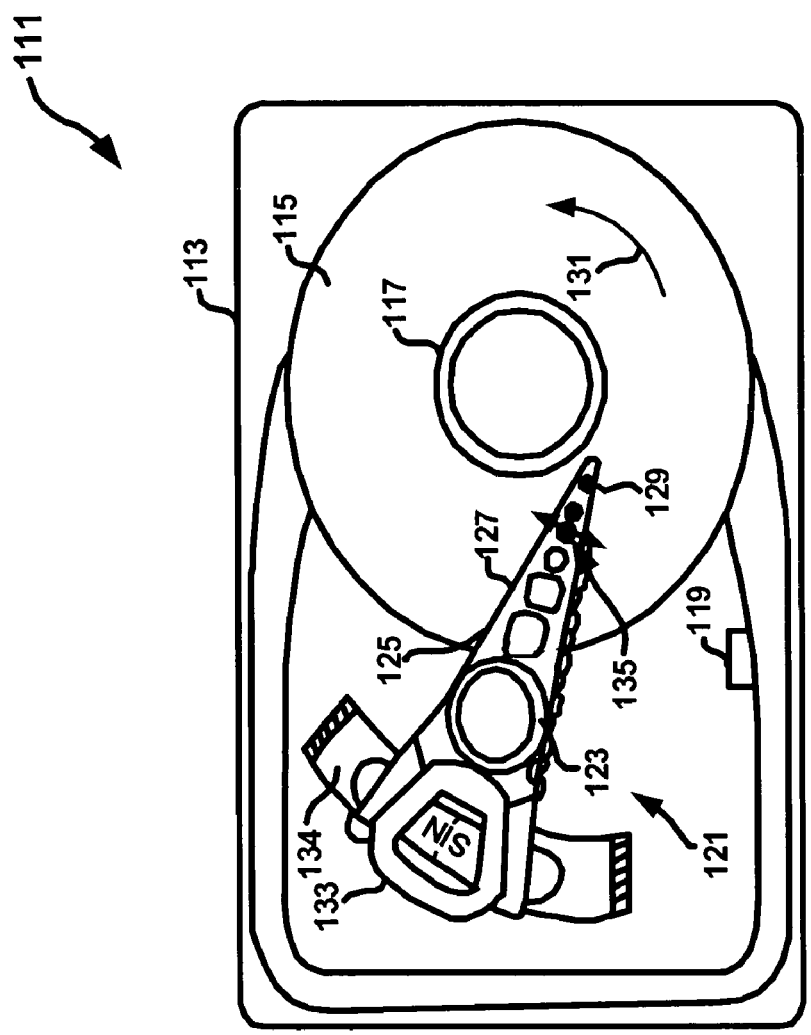
FIG. 1 is a schematic, top plan view of an exemplary hard disk drive in accordance with embodiments of the invention.

FIG. 1 is a schematic, top plan view of an exemplary hard disk drive 111 in accordance with embodiments of the invention. It is appreciated that the magnetic hard disk file or drive 111 can be utilized by a computer system (e.g., 600 of FIG. 6). Drive 111 has an outer housing or base 113 containing a disk pack having at least one media or magnetic disk 115. The disk or disks 115 are rotated (see arrow 131) by a spindle motor assembly having a central drive hub 117. An actuator 121 can include a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write head magnetically reads data from and/or magnetically writes data to disk 115. The level of integration called the head gimbal assembly is head and the slider 129, which are mounted on suspension 127. The slider 129 is usually bonded to the end of suspension 127. The head is typically "pico" size (approximately 1250× 1000×300 microns) and formed from ceramic or intermetallic materials. The head also may be of "femto" size (approximately 850×700×230 microns) and is pre-loaded against the surface of disk 115 (in the range two to ten grams) by suspension 127.

Within FIG. 1, suspensions 127 have a spring-like quality, which biases or urges the air-bearing surface of the slider 129 against the disk 115 to cause the slider 129 to fly at a precise distance or height from the disk 115. A voice coil 133 free to move within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies along radial arcs across tracks on the disk 115 until the heads settle on their respective target tracks. The head gimbal assemblies operate in a conventional manner and move in unison with one another, unless drive 111 uses multiple independent actuators (not shown) wherein the arms can move independently of one another.

Figure 2:
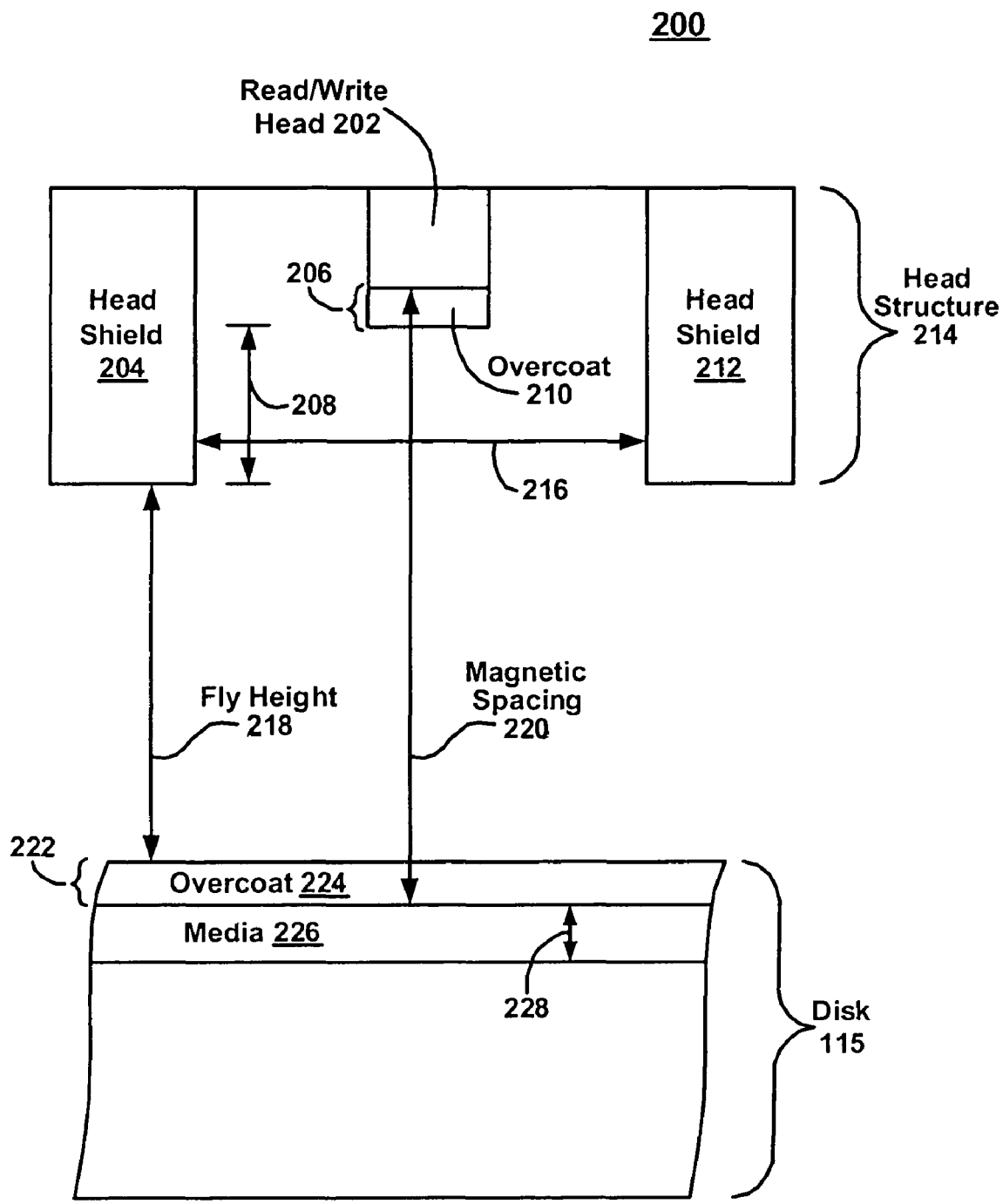
FIG. 2 is a cross-sectional view of portions of a hard disk drive in accordance with embodiments of the invention.

FIG. 2 is a cross-sectional view 200 of portions of a hard disk drive (e.g., 111) that includes an exemplary magnetic read/write head structure 214 along with a portion of a magnetic disk 115 in accordance with embodiments of the invention. It is appreciated that one or more embodiments in accordance with the invention can enable quantitatively determining a "flying" height 218 between the head structure 214 and the disk 115.

For example, within one embodiment, a pattern can be magnetically written on disk 115 via a read/write transducer head 202 in such a manner to generate a harmonic having a first measured harmonic and another higher order measured harmonic which information can be stored. A magnetic spacing distance 220 can then be determined utilizing the first and the higher order measured harmonics along with other known parameters, such as but not limited to, a read gap length 216. Note that the read gap length 216 can be the distance between head shields 204 and 212 of head structure 214. It is appreciated that the magnetic spacing 220 can be the distance between the read/write transducer head 202 and magnetic media 226 of disk 115. However, as seen in cross-sectional view 200, the value of the magnetic spacing 220 can include a greater distance than the value of the flying height 218. As such, one or more different parameters can be subtracted from the determined value of the magnetic spacing 220 in order to obtain the value of the flying height 218.

For instance, within FIG. 2, one parameter that can be subtracted from the determined value of the magnetic spacing 220 is the thickness 222 of an overcoat material 224 that covers disk 115. Another parameter that can be subtracted from the determined value of the magnetic spacing 220 is the thickness 206 of an overcoat material 210 that covers the read/write head 202. Note that within the present embodiment, the "bottom" surface(s) of the head structure 214 is closer to the "top" surface of the disk 115 than the "bottom" surface of overcoat 210 of the read/write head 202. As such, the recess distance 208 between the "bottom" surface of head structure 214 and the "bottom" surface of the overcoat 210 on head 202 can be a parameter which can be subtracted from the determined value of the magnetic spacing 220. Therefore, it is appreciated that the flying height 218 can be obtained by subtracting from the determined magnetic spacing 220, but not limited to, the thickness 222 of overcoat 224 of disk 115, the thickness 206 of overcoat 210 of head 202, and/or the recess distance 208.

FIG. 3 is a flowchart of a method 300 in accordance with embodiments of the invention for determining a flying height of a read/write head structure of a hard disk drive above a magnetic disk. Method 300 includes exemplary processes of embodiments of the invention which can be carried out by a processor(s) and electrical components under the control of computing device readable and executable instructions (or code), e.g., software. The computing device readable and executable instructions (or code) may reside, for example, in data storage features such as volatile memory, non-volatile memory, and/or mass data storage that are usable by a computing device. However, the computing device readable and executable instructions (or code) may reside in any type of computing device readable medium. Although specific operations are disclosed in method 300, such operations are exemplary. That is, method 300 may not include all of the operations illustrated by FIG. 3. Alternatively, method 300 may include various other operations and/or variations of the operations shown by FIG. 3. Likewise, the sequence of the operations of method 300 can be modified. It is noted that the operations of method 300 can be performed by software, by firmware, by hardware, or by any combination thereof.

Specifically, to determine a flying height of a read/write head structure of a hard disk drive above a magnetic disk, a pattern can be magnetically written onto the disk via a read/write transducer head to establish a harmonic having a first measured harmonic and another higher order measured harmonic. A magnetic spacing distance between the read/write transducer head of the read/write head structure and the disk can be determined by utilizing the first measured harmonic and the higher order measured harmonic, along with other parameters. The flying height between the read/write head structure and the "top" surface of the disk can be determined by subtracting one or more parameters from the determined magnetic spacing distance. In this manner, the flying height of the read/write head structure of a hard disk drive can be quantitatively determined.

At operation 302 of FIG. 3, to determine a flying height (e.g., 218) of a read/write head structure (e.g., 214) of a hard disk drive (e.g., 111) above a magnetic disk (e.g., 115), a pattern can be magnetically written onto the disk via a read/write transducer head (e.g., 202) of the read/write head structure to establish a harmonic having a first measured harmonic and another higher order measured harmonic. It is appreciated that operation 302 can be implemented in a wide variety of ways. For example, at operation 302, the first measured harmonic and the higher order measured harmonic can be, but are not limited to, a measured first harmonic and a measured third harmonic. In one embodiment, at operation 302, it can be desirable to have a write pattern that produces or generates a small ratio between the first measured harmonic and the higher order measured harmonic. In one embodiment, the write pattern that can be magnetically written onto the disk at operation 302 can include the logic "1" and "0" pattern: 111100111100 . . . which has a larger third harmonic. However, there may be other write patterns that can produce a small ratio between the first measured harmonic and the higher order measured harmonic, such as pattern: 1111110011111100 . . . .

At operation 304, a magnetic spacing distance (e.g., 220) between a read/write transducer head (e.g., 202) of the read/write head structure and the disk (e.g., 115) can be determined by utilizing the first measured harmonic and the higher order measured harmonic, along with other parameters. It is appreciated that operation 304 can be implemented in a wide variety of ways. For example, within one embodiment, given the write pattern at operation 302 is implemented as:

```
1       1   1       1    0 0  1  1   1   0  0...
|-- λ₃ --|
|---------------- λ₁ ---------------------|
``` wherein $\lambda_1$ represents the wavelength of the first measured harmonic while $\lambda_3$ represents the wavelength of the third measured harmonic. As such, the Fourier transform of the above sequence can be represented by:

$$V(k) = V_{sp}(k) \sum_n (-1)^n e^{ikBn}$$

wherein $V_{sp}(k)$ can be the Fourier transform of a step transition. It is noted that $V_{sp}(k)$ can be expressed as follows:

$$V_{sp}(k) = C\frac{1-e^{-k\delta}}{k}\frac{\sin(1.11\,kg/2)}{1.11\,kg/2}e^{-k(d+a)}$$

Note that if "F" is represented by:

$$F = C\frac{1-e^{-k\delta}}{k}\frac{\sin(1.11\,kg/2)}{1.11\,kg/2} * \sum_n (-1)^n e^{ikBn}$$

than the intensity $V_1$ of the first harmonic can be represented by:

$$V_1 = F_1 e^{-2\pi(d+\alpha)/\lambda_1}$$

wherein $F_1$ is evaluated for the first harmonic frequency $k_1$. Additionally, the intensity $V_3$ of the third harmonic can be represented by:

$$V_3 = F_3 e^{-2\pi(d+\alpha)/\lambda_3}$$

wherein $F_3$ is evaluated for the third harmonic frequency $k_3$. As such, the magnetic spacing "d" plus a transition parameter "a" can be represented by:

$$d+\alpha = (3\lambda_3/4\pi)Ln(V_1/V_3) + (3\lambda_3/4\pi)Ln(F_3/F_1)$$

wherein the "$(3\lambda_3/4\pi)Ln(F_3/F_1)$" term can be referred to as a correction term or a magnetic spacing correction term. Note that the correction term can be a function of a read gap length "g" (e.g., 216), magnetic media thickness δ (e.g., 228), and the write pattern used.

Figure 4:
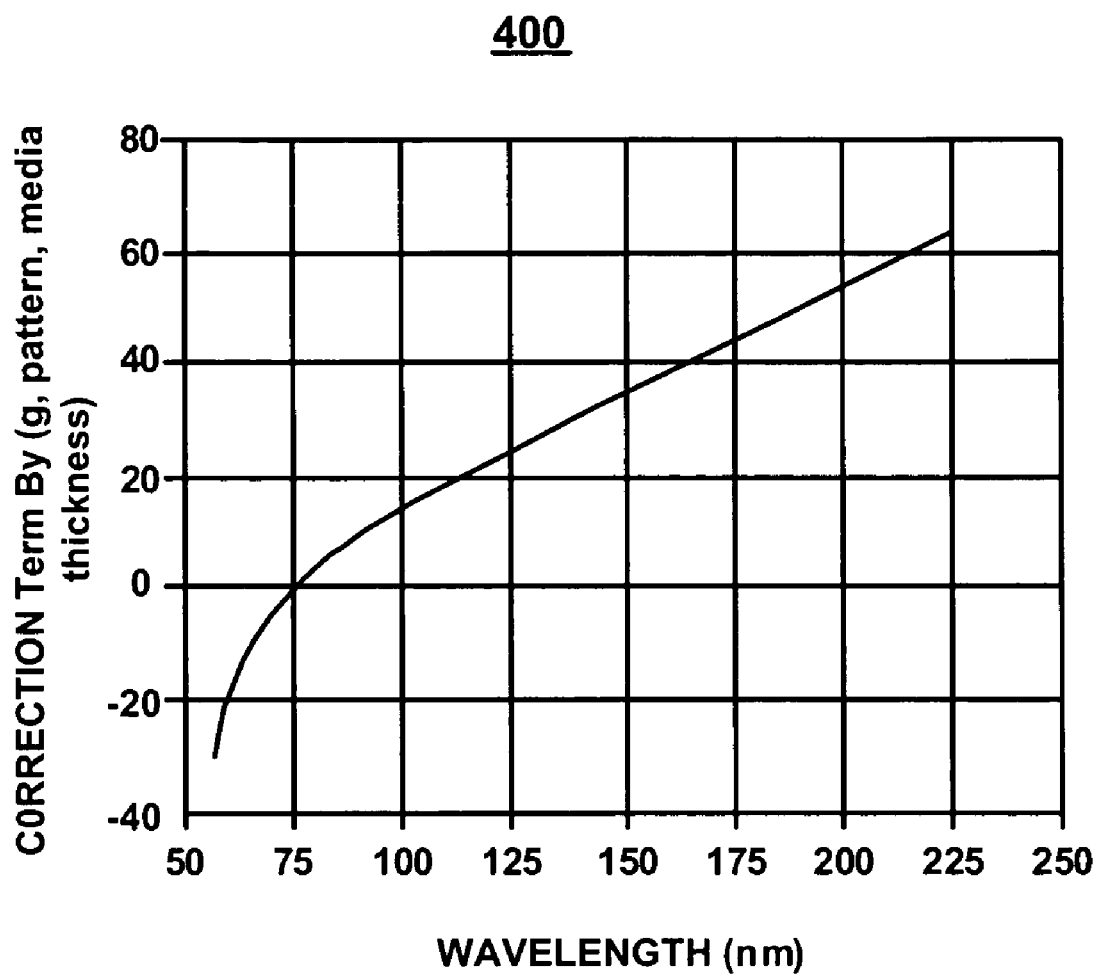
FIG. 4 is a graph in accordance with embodiments of the invention.

It is noted that there is a way to determine a desired testing wavelength value from the above "d+a" equation so that the correction term is close to or approximately zero. For example, given a hard disk drive product (g=66 nanometers (nm), δ=17 nm, and "a" is about 10 nm), FIG. 4 is a graph 400 in accordance with embodiments of the invention of different correction terms (Y-axis) corresponding to different wavelength values (X-axis). As such, within graph 400, the wavelength λ suggested for testing is 75 nm so that the correction term can be close to or approximately zero. With the correction term equal to zero within this example, the "d+a" equation can be reduced to:

$$d+a = (3\lambda_3/4\pi)Ln(V_1/V_3)$$

and then the magnetic spacing "d" can be represented by:

$$d = ((3\lambda_3/4\pi)Ln(V_1/V_3)) - a$$

It is appreciated that the transition parameter "a" can be referred to as a writer transition that occurs when the read/write transducer head is writing data to the magnetic disk. The writer transition can involve positive pull and/or negative pull that can result in a path that "wiggles" that has a width. That width can be referred to as the transition parameter.

At operation 306 of FIG. 3, the flying height (e.g., 218) between the read/write head structure and the "top" surface of the disk can be determined by subtracting one or more parameters from the determined magnetic spacing distance (e.g., 220). It is understood that operation 306 can be implemented in a wide variety of ways. For example, one parameter that can be subtracted from the determined magnetic spacing distance is the thickness (e.g., 222) of an overcoat material (e.g., 224) that covers the disk. Another parameter that can be subtracted from the determined magnetic spacing distance is the thickness (e.g., 206) of an overcoat material (e.g., 210) that covers the read/write head. Yet another parameter that can be subtracted from the determined magnetic spacing distance is the recess distance (e.g., 208) between the head structure surface closest to the disk and the overcoat surface on the read/write head closest to the disk. It is appreciated that the flying height can be obtained by subtracting from the determined magnetic spacing distance, but not limited to, the thickness of the overcoat on the disk, the thickness of the overcoat on the head, the recess distance, and/or the transition parameter.

FIG. 5 is a flowchart of a method 500 in accordance with embodiments of the invention for determining a flying height of a read/write head structure of a hard disk drive above a magnetic disk. Method 500 includes exemplary processes of embodiments of the invention which can be carried out by a processor(s) and electrical components under the control of computing device readable and executable instructions (or code), e.g., software. The computing device readable and executable instructions (or code) may reside, for example, in data storage features such as volatile memory, non-volatile memory, and/or mass data storage that are usable by a computing device. However, the computing device readable and executable instructions (or code) may reside in any type of computing device readable medium. Although specific operations are disclosed in method 500, such operations are exemplary. That is, method 500 may not include all of the operations illustrated by FIG. 5. Alternatively, method 500 may include various other operations and/or variations of the operations shown by FIG. 5. Likewise, the sequence of the operations of method 500 can be modified. It is noted that the operations of method 500 can be performed by software, by firmware, by hardware, or by any combination thereof.

Specifically, to determine a flying height of a read/write head structure of a hard disk drive above a magnetic disk, a harmonic test can be utilized on the disk that produces a first result and a second result. A magnetic spacing distance between a read/write transducer head of the read/write head structure and the disk can be determined by utilizing the first result and the second result. The flying height between the read/write head structure and the "top" surface of the disk can be determined by utilizing the determined magnetic spacing distance. In this manner, the flying height of the read/write head structure of a hard disk drive can be quantitatively determined.

At operation 502 of FIG. 5, to determine a flying height (e.g., 218) of a read/write head structure (e.g., 214) of a hard disk drive (e.g., 111) above a magnetic disk (e.g., 115), a harmonic test can be utilized on the disk that produces a first result and a second result. It is appreciated that operation 502 can be implemented in a wide variety of ways. For example, the harmonic test at operation 502 can include writing a pattern magnetically onto the disk in any manner similar to that described herein, but is not limited to such. The first result at operation 502 can be a particular measured harmonic of the harmonic test while the second result can be a different measured harmonic of the harmonic test. The harmonic test can be implemented in any manner similar to that described herein, but is not limited to such.

At operation 504, a magnetic spacing distance (e.g., 220) between a read/write transducer head (e.g., 202) of the read/write head structure and the disk can be determined by utilizing the first result and the second result. It is appreciated that operation 504 can be implemented in a wide variety of ways. For example, the magnetic spacing distance can be determined at operation 504 in any manner similar to that described herein, but is not limited to such.

At operation 506, the flying height (e.g., 218) between the read/write head structure and the disk surface closest to it can be determined by utilizing the determined magnetic spacing distance. It is appreciated that operation 506 can be implemented in a wide variety of ways. For example, the flying height can be determined at operation 506 utilizing the determined magnetic spacing distance in any manner similar to that described herein, but is not limited to such.

Figure 6:
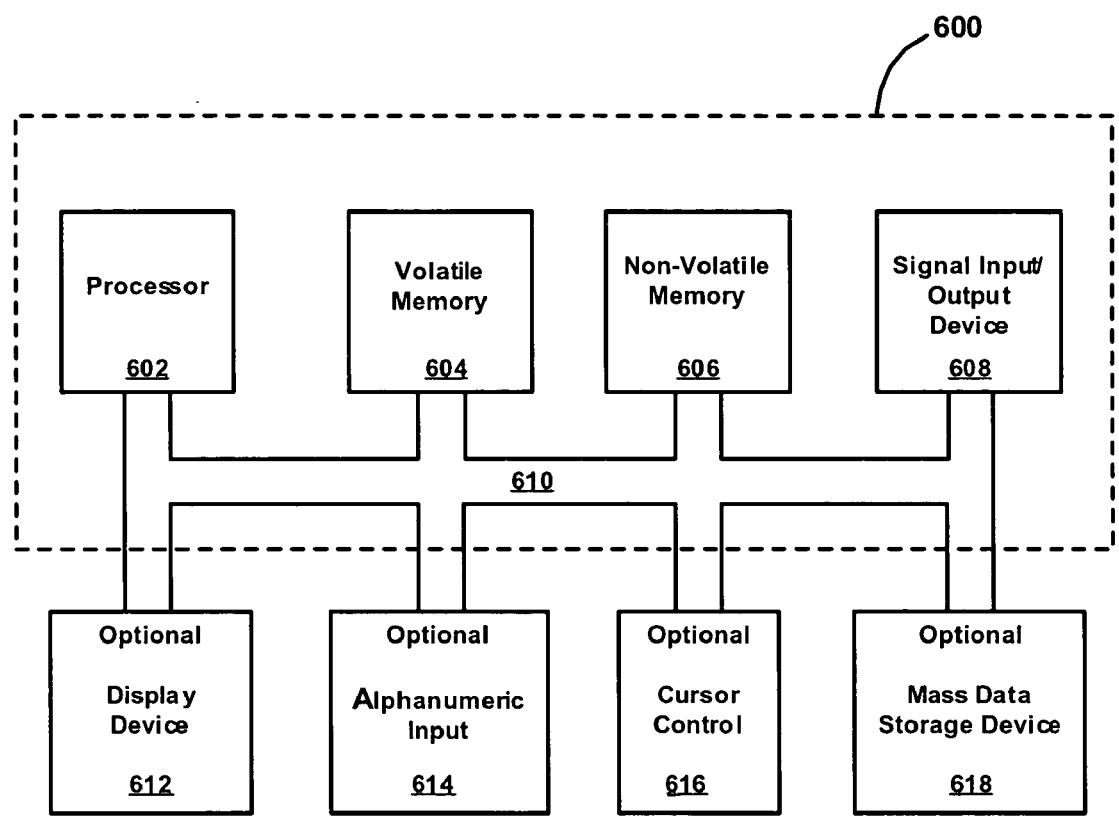
FIG. 6 is a block diagram of an exemplary computing system that can be used in accordance with embodiments of the invention.

FIG. 6 is a block diagram of an exemplary computing device or system 600 that can be used in accordance with embodiments of the invention. It is understood that system 600 is not strictly limited to be a computing system. As such, system 600 of the present embodiment is well suited to be any type of computing device (e.g., server computer, desktop computer, laptop computer, portable computing device, database computer, etc.). In its various implementations, system 600 may not include all of the elements illustrated by FIG. 6, or system 600 may include other elements not shown by FIG. 6. Within the discussions of embodiments in accordance with the invention herein, certain processes and operations were discussed that may be realized, in some embodiments, as a series of instructions (e.g., software program) that reside within computing device readable memory of system 600 and executed by a processor(s) of system 600. When executed, the instructions can cause computing device 600 to perform specific operations and exhibit specific behavior which are described herein.

Computer system 600 can include an address/data bus 610 for communicating information, one or more central processors 602 coupled with bus 610 for processing information and instructions. Central processor unit(s) 602 may be a microprocessor or any other type of processor. The computer 600 can also include data storage features such as computing device usable volatile memory 604, e.g., random access memory (RAM), static RAM, dynamic RAM, etc., coupled with bus 610 for storing information and instructions for central processor(s) 602, computing device usable non-volatile memory 606, e.g., read only memory (ROM), programmable ROM, flash memory, erasable programmable read only memory (EPROM), electrically erasable programmable read only memory (EEPROM), etc., coupled with bus 610 for storing static information and instructions for processor(s) 602.

System 600 of FIG. 6 can also include one or more signal generating and receiving devices 608 coupled with bus 610 for enabling system 600 to interface with other electronic devices. The communication interface(s) 608 of the present embodiment may include wired and/or wireless communication technologies. For example, in one embodiment of the invention, the communication interface 608 is a serial communication port, but could also alternatively be any of a number of well known communication standards and protocols, e.g., a Universal Serial Bus (USB), an Ethernet adapter, a FireWire® (IEEE 1394) interface, a parallel port, a small computer system interface (SCSI) bus interface, an infrared (IR) communication port, a Bluetooth® wireless communication adapter, a broadband connection, and the like. In another embodiment, a cable or digital subscriber line (DSL) connection may be employed. In such a case the communication interface(s) 608 may include a cable modem or a DSL modem.

Optionally, computer system 600 can include an alphanumeric input device 614 including alphanumeric and function keys coupled to the bus 610 for communicating information and command selections to the central processor(s) 602. The computer 600 can also include an optional cursor control or cursor directing device 616 coupled to the bus 610 for communicating user input information and command selections to the processor(s) 602. The cursor directing device 616 can be implemented using a number of well known devices such as, but not limited to, a mouse, a track ball, a track pad, an optical tracking device, a touch screen, etc. Alternatively, it is appreciated that a cursor can be directed and/or activated via input from the alphanumeric input device 614 using special keys and key sequence commands. The present embodiment is also well suited to directing a cursor by other means such as, for example, voice commands.

The system 600 of FIG. 6 can also include an optional computing device usable mass data storage device 618 such as a magnetic or optical disk and disk drive (e.g., hard drive 111) coupled with bus 610 for storing information and instructions. An optional display device 612 can be coupled to bus 610 of system 600 for displaying video and/or graphics. It should be appreciated that optional display device 612 may be a cathode ray tube (CRT), flat panel liquid crystal display (LCD), field emission display (FED), plasma display, or any other display device suitable for displaying video and/or graphic images and alphanumeric characters recognizable to a user.

It is noted that the components associated with system 600 described above may be resident to and associated with one physical computing device. However, one or more of the components associated with system 600 may be physically distributed to other locations and be communicatively coupled together (e.g., via a network).

The foregoing descriptions of specific embodiments of the invention have been presented for purposes of illustration and description. They are not intended to be exhaustive or to limit the invention to the precise forms disclosed, and obviously many modifications and variations are possible in light of the above teaching. The invention can be construed according to the claims and their equivalents.

What is claimed is:

1. A method comprising:
    writing a first write pattern on a magnetic disk;
    utilizing a harmonic test on said magnetic disk of a hard disk drive that produces a first result and a second result concurrently with said writing;
    determining a magnetic spacing distance between a transducer head of said hard disk drive and said magnetic disk utilizing said first result and said second result and a writer transition that is associated with said transducer head writing data to said magnetic disk; and
    determining a flying height between a head structure of said hard disk drive and a surface of said magnetic disk utilizing said magnetic spacing distance.

2. The method as described in claim 1, wherein said utilizing said harmonic test comprises writing a pattern magnetically onto said magnetic disk.

3. The method as described in claim 1, wherein said utilizing said harmonic test on said magnetic disk comprises utilizing said transducer head.

4. The method as described in claim 1, wherein:
    said first result comprises a first measured harmonic of said harmonic test; and
    said second result comprises a second measured harmonic of said harmonic test.

5. The method as described in claim 1, wherein said determining said magnetic spacing distance comprises utilizing a read gap length that is the distance between two head shields associated with said transducer head.

6. The method as described in claim 1, wherein said determining said magnetic spacing distance comprises utilizing a thickness of magnetic media of said magnetic disk.

7. The method as described in claim 1, wherein said determining said flying height further comprises utilizing a thickness of a coating disposed above said magnetic disk.

8. The method as described in claim 1, wherein said determining said magnetic spacing distance comprises utilizing a magnetic spacing correction term.

9. The method as described in claim 1, wherein said determining said flying height further comprises utilizing a thickness of a coating of material on said transducer head.

10. A system comprising:
   means for writing a first pattern onto a magnetic disk of a hard disk drive to establish a harmonic having a first measured harmonic and a second measured harmonic, said writing performed concurrently with measuring said first and second harmonics;
   means for determining a magnetic spacing distance between a transducer head of said hard disk drive and said magnetic disk utilizing said first measured harmonic and said second measured harmonic and a writer transition that is associated with said transducer head writing data to said magnetic disk; and
   means for determining a flying height between a head structure of said hard disk drive and a surface of said magnetic disk by subtracting a parameter from said magnetic spacing distance.

11. The system of claim 10, wherein said parameter comprises a thickness of a coating of material on said magnetic disk.

12. The system of claim 11, wherein said means for determining said flying height further comprises utilizing a thickness of a coating of material on said transducer head.

13. The system of claim 12, wherein said parameter comprises a distance that a surface of said coating of material is recessed from a head structure surface located closest to said surface of said magnetic disk.

14. The system of claim 10, wherein parameter comprises a thickness of a coating of material on said transducer head.

15. The system of claim 10, wherein said means for determining said magnetic spacing distance further comprises utilizing a read gap length that is the distance between two head shields associated with said head structure.

16. The system of claim 10, wherein said means for writing said pattern onto said magnetic disk comprises utilizing said transducer head.

17. The system of claim 10, wherein said means for determining said magnetic spacing distance further comprises utilizing a magnetic spacing correction term.

18. A non-transitory computing device readable medium having readable code embodied therein for causing a system to perform a method comprising:
   writing a pattern onto a magnetic disk of a hard disk drive to establish a harmonic having a first measured harmonic and a second measured harmonic;
   determining a magnetic spacing distance between a transducer head of said hard disk drive and said magnetic disk utilizing said first measured harmonic and said second measured harmonic and a writer transition that is associated with said transducer head writing data to said magnetic disk wherein said writing is performed concurrently with measuring said first and second harmonics; and
   determining a flying height between a head structure of said hard disk drive and a surface of said magnetic disk by utilizing said magnetic spacing distance and a parameter.

19. The non-transitory computing device readable medium of claim 18, wherein said writing said pattern onto said magnetic disk comprises utilizing said transducer head.

20. The non-transitory computing device readable medium of claim 18, wherein said determining said magnetic spacing distance further comprises utilizing a read gap length that is the distance between two head shields of said head structure.

21. The non-transitory computing device readable medium of claim 18, wherein said determining said magnetic spacing distance comprises utilizing a thickness of magnetic media of said magnetic disk.

22. The non-transitory computing device readable medium of claim 18, wherein said parameter comprises a thickness of a coating of material on said magnetic disk.

23. The non-transitory computing device readable medium of claim 18, wherein said parameter comprises a thickness of a coating of material on said transducer head.

24. The non-transitory computing device readable medium of claim 18, wherein said determining said flying height further comprises utilizing a recess distance.

25. A method comprising:
   writing a pattern to a magnetic disk
   utilizing a harmonic test on said magnetic disk of a hard disk drive that produces a first result and a second result wherein said writing is performed concurrently with said harmonic test; and
   determining a magnetic spacing distance between a transducer head of said hard disk drive and said magnetic disk utilizing said first result and said second result and a writer transition that is associated with said transducer head writing data to said magnetic disk.

26. The method as described in claim 25, wherein said utilizing said harmonic test comprises writing a pattern magnetically onto said magnetic disk.

27. The method as described in claim 25, wherein said utilizing said harmonic test on said magnetic disk comprises utilizing said transducer head.

28. The method as described in claim 25, wherein:
   said first result comprises a first measured harmonic of said harmonic test; and
   said second result comprises a second measured harmonic of said harmonic test.

29. The method as described in claim 25, wherein said determining said magnetic spacing distance further comprises utilizing a read gap length that is the distance between two head shields associated with said transducer head.

30. The method as described in claim 25, wherein said determining said magnetic spacing distance further comprises utilizing a thickness of magnetic media of said magnetic disk.

31. The method as described in claim 25, wherein said determining said magnetic spacing distance further comprises utilizing a magnetic spacing correction term.

32. The method as described in claim 25, wherein said transducer head is part of a head structure.

* * * * *